US010794457B2

(12) United States Patent
McLane

(10) Patent No.: US 10,794,457 B2
(45) Date of Patent: Oct. 6, 2020

(54) POWER TAKE OFF DRIVELINE LIFT AND COUPLING ASSIST DEVICE

(71) Applicant: Blount, Inc., Portland, OR (US)

(72) Inventor: Mark McLane, Dixon, IL (US)

(73) Assignee: Blount, Inc., Portland, OR (US)

(*) Notice: Subject to any disclaimer, the term of this patent is extended or adjusted under 35 U.S.C. 154(b) by 184 days.

(21) Appl. No.: 15/976,721

(22) Filed: May 10, 2018

(65) Prior Publication Data
US 2019/0063565 A1    Feb. 28, 2019

Related U.S. Application Data

(60) Provisional application No. 62/550,411, filed on Aug. 25, 2017.

(51) Int. Cl.
| F16H 21/44 | (2006.01) |
| A01B 71/06 | (2006.01) |
| A01B 59/00 | (2006.01) |
| B60K 17/28 | (2006.01) |

(52) U.S. Cl.
CPC ............. *F16H 21/44* (2013.01); *A01B 59/00* (2013.01); *A01B 71/06* (2013.01); *B60K 17/28* (2013.01)

(58) Field of Classification Search
CPC ....... A01B 74/06; A01B 59/00; A01B 71/063; F16H 21/44
See application file for complete search history.

(56) References Cited

U.S. PATENT DOCUMENTS

| 2,869,660 | A | * | 1/1959 | Krause | A01B 71/06 180/14.4 |
| 3,007,535 | A | * | 11/1961 | Lippke | F16D 3/841 180/14.1 |
| 3,847,415 | A | | 11/1974 | Geisthoff | |
| 3,871,463 | A | | 3/1975 | Geisthoff | |
| 3,961,677 | A | * | 6/1976 | Geisthoff | A01B 59/042 180/14.4 |
| 4,058,990 | A | * | 11/1977 | Von Allworden | A01B 71/066 180/14.1 |
| 4,071,105 | A | | 1/1978 | von Allworden | |
| 4,184,558 | A | | 1/1980 | de Buhr et al. | |
| 4,934,471 | A | | 6/1990 | Tanaka et al. | |

(Continued)

FOREIGN PATENT DOCUMENTS

| DE | 2247903 A1 | 4/1974 |
| DE | 19803604 A1 | 8/1998 |

(Continued)

*Primary Examiner* — Patrick Cicchino
(74) *Attorney, Agent, or Firm* — Schwabe, Williamson & Wyatt, P.C.

(57) ABSTRACT

An assist device for lifting and facilitating the coupling of an implement's driveline to a power take-off on a vehicle is disclosed. The assist device is configured with a handle enabling a user to rotate the device from a storage position to an upright position where the device engages the driveline and hits it into a position suitable for coupling the driveline to the power take-off. The assist device is equipped with a roller to allow the driveline to slide along its longitudinal axis to facilitate coupling. The assist device may be equipped with one or more springs to further accept at least some of the weight of the driveline and enable easier maneuvering of the driveline during the coupling process.

20 Claims, 4 Drawing Sheets

(56) References Cited

U.S. PATENT DOCUMENTS

| | | | |
|---|---|---|---|
| 5,303,789 A | | 4/1994 | Adamson et al. |
| 5,303,790 A | | 4/1994 | Coleman |
| 6,015,016 A | * | 1/2000 | Anderson ............ A01B 61/025 |
| | | | 172/677 |
| 6,234,452 B1 | | 5/2001 | Johnson |
| 7,278,502 B2 | | 10/2007 | Trefz et al. |
| 9,615,502 B1 | | 4/2017 | Smith et al. |
| 10,343,518 B2 | * | 7/2019 | Kraus ................... A01B 71/06 |
| 2008/0115983 A1 | | 5/2008 | Priepke et al. |
| 2010/0327144 A1 | * | 12/2010 | Steffensen ............ B60K 17/28 |
| | | | 248/671 |
| 2016/0113189 A1 | | 4/2016 | Huegerich |

FOREIGN PATENT DOCUMENTS

| | | | |
|---|---|---|---|
| EP | 1982580 A2 | 10/2008 | |
| WO | WO9116811 A1 | 11/1991 | |

\* cited by examiner

POWER TAKE OFF DRIVELINE LIFT AND COUPLING ASSIST DEVICE

RELATED APPLICATIONS

This application claims priority to U.S. Provisional Patent Application No. 62/550,411, filed on Aug. 25, 2017, which is incorporated in its entirety by this reference.

TECHNICAL FIELD

The present disclosure relates to the field of powered implements and associated vehicles, e.g. tractors, ATVs, UTVs, etc., and specifically to an assist device for power take off (PTO) driveline lifting and coupling.

BACKGROUND

Powered implements are a common fixture on many parcels of land that are either undeveloped or used for agricultural purposes. Such implements can include mowers, tillers, plows, bailers, and similar such equipment for working the land. These implements may attach to an equipment hitch on a tractor or similar vehicle, and thereby be towed. The implements may also receive power to operate via a power take-off (PTO) located on the rear of the tractor proximate to the hitch, which may be driven by the tractor's engine and may provide a rotational motion of several hundred RPM (typically). The PTO typically consists of a short splined shaft, although configurations and specifications may vary depending upon the type of equipment and/or manufacturer.

An implement may be equipped with a driveline fitted with a receiver configured to be coupled to the PTO, such as a splined receiver where the PTO is a splined shaft. The driveline, in turn, is mechanically connected to the implement to supply the power necessary for the implement to carry out its work. The tractor or similar vehicle can be utilized with a variety of powered implements but can usually only tow and run one implement at a time, and thus swapping between implements is required. To do so, the user must disconnect the driveline of one implement and connect the driveline of another.

The driveline of an implement is typically comprised of multiple components, including, but not limited to, a shaft, a universal joint (U-joint) at one end, and a constant velocity joint (CV-joint) at the other, usually proximate to the splined receiver. The combined weight of these components can exceed 60 lbs. Thus, swapping between implements without the assistance of another person can require significant physical effort, with the user having to hold the weight of the driveline while simultaneously aligning and operating the receiver to couple it to the PTO. Depending upon the particular configuration of the driveline, this effort may be further complicated by the need to correctly position the receiver relative to the PTO with one hand, which may have a tendency to flop around owing to its connection to the CV-joint, while supporting the driveline weight with the other hand.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

DETAILED DESCRIPTION OF DISCLOSED EMBODIMENTS

Figure 1:
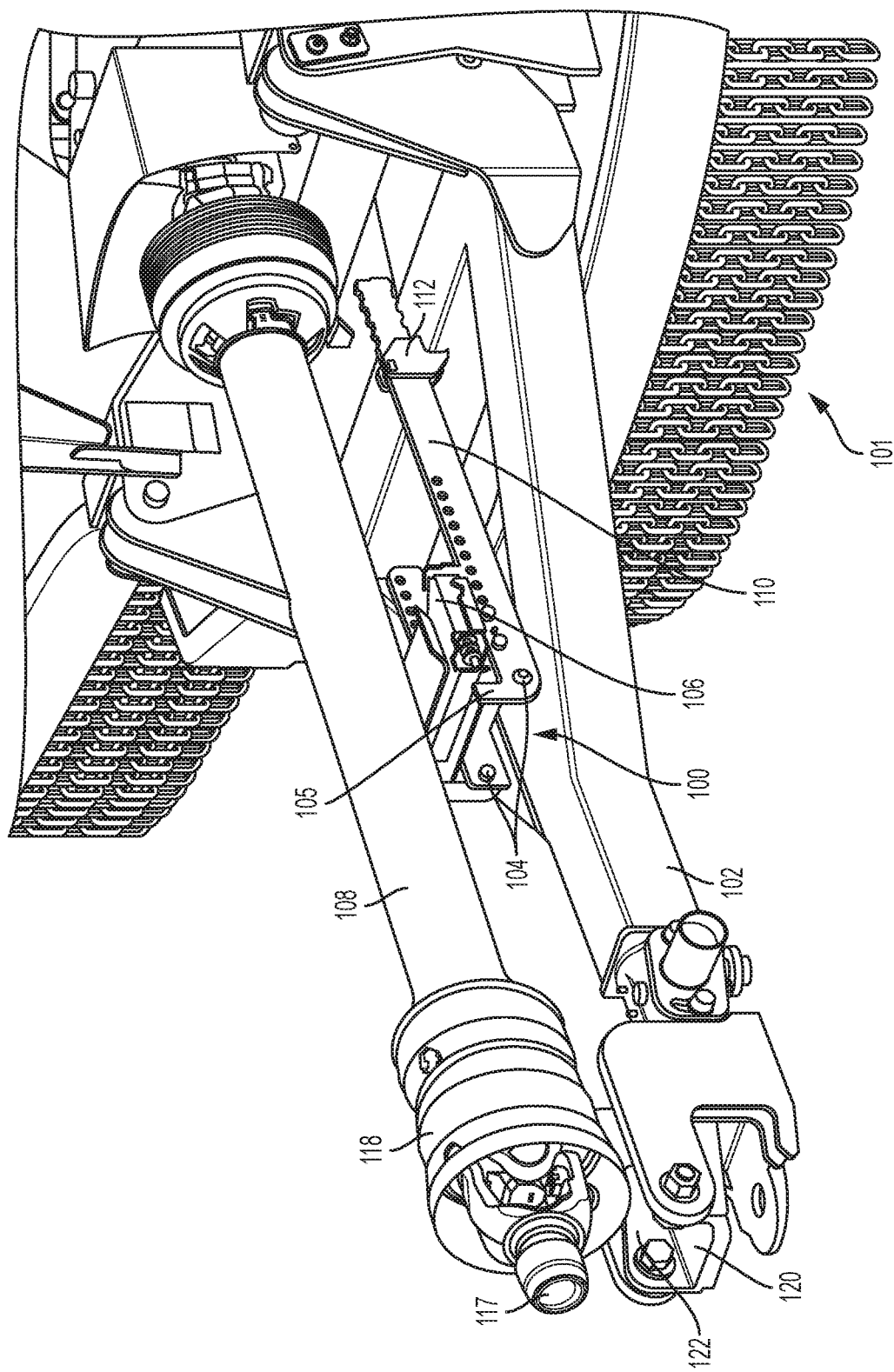
FIG. 1 illustrates a side perspective view of a PTO driveline lift and coupling assist device in accordance with various embodiments, with the assist device in a storage position.

In the following detailed description, reference is made to the accompanying figures which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical contact with each other. "Coupled" may mean that two or more elements are in direct physical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

Embodiments disclosed herein provide a driveline lift and coupling assist device that can be secured to an implement to assist in the positioning of the implement's driveline for coupling to a tractor or similar vehicle's PTO. The assist device can be moved between storage and use positions without the need for manually lifting the driveline onto or out of the assist device's cradle. When moved to a use position, the assist device may rise to engage with and lift the driveline up away from the implement, so that the driveline is positioned proximate to the PTO in preparation for coupling.

The assist device may be equipped with one or more springs that may be configured to accept at least part of the weight of the driveline when the assist device is in a use position. The cradle may also be equipped with a roller or a similarly suited feature that directly receives the driveline in a way that facilitates lateral movement, e.g. sliding, of the driveline relative to the cradle, both as the cradle engages the driveline while being moved into position and as the driveline is positioned with respect to the PTO. The combination of one or more springs and a roller or similar feature that promotes sliding may facilitate fine positioning of the driveline for coupling to the PTO. Furthermore, an implement can be decoupled from a tractor or other vehicle, and the assist device can be placed into a storage position without having to lift the driveline from the cradle, thus helping to preserve the longevity of the one or more springs.

Figure 2:
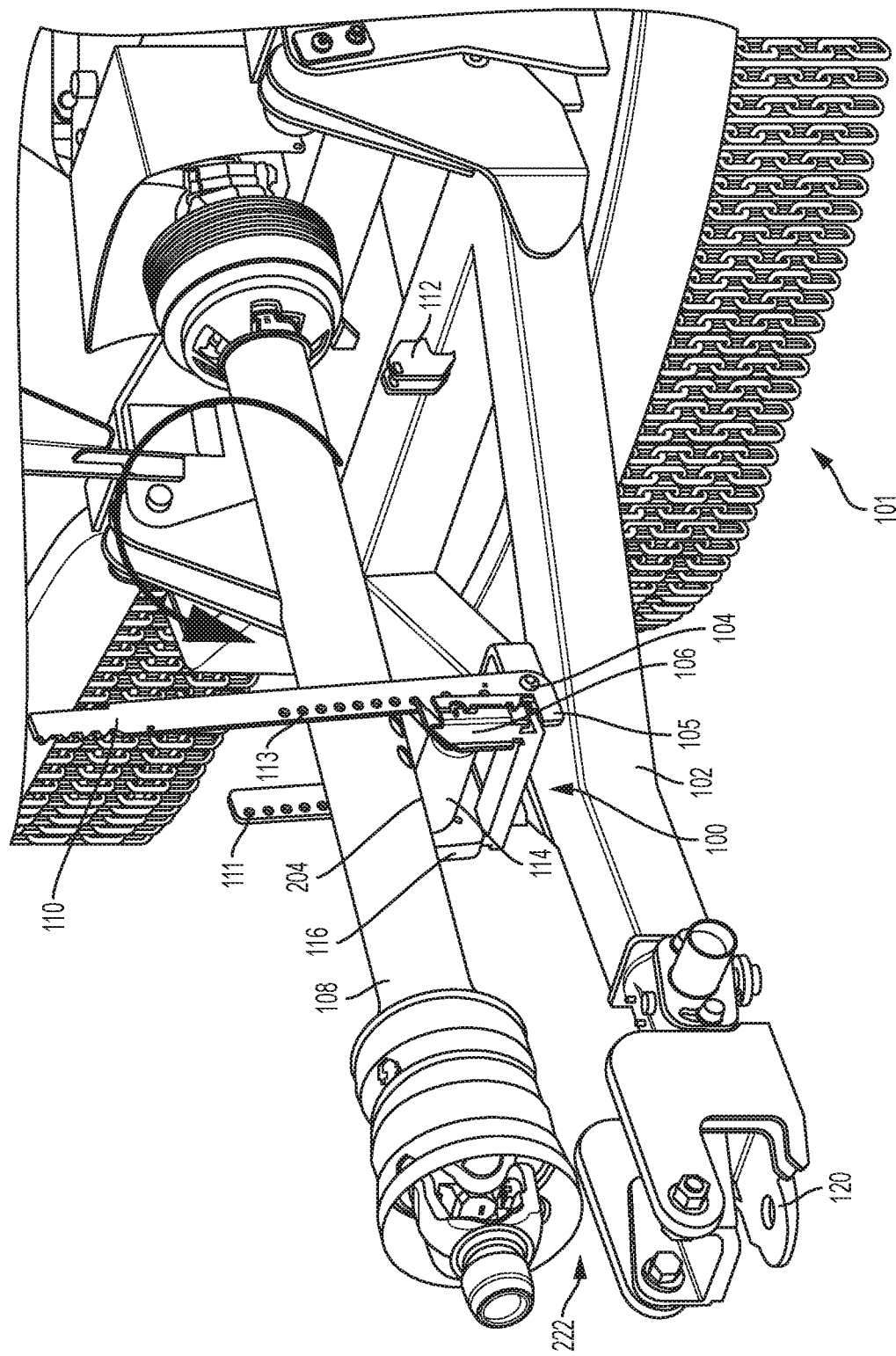
FIG. 2 illustrates a side perspective view of the assist device of FIG. 1, with the assist device in a use position, according to various embodiments.

FIGS. 1 and 2 disclose a driveline lift and coupling assist device 100. In the depicted embodiment, assist device 100 may be mounted to frame 102, shown as the hitch tongue of implement 101, by way of one or more pivots 104. Assist device 100 may include a cradle 106 that is sized to at least receive driveline 108. A handle 110 may be affixed to the assist device 100 to facilitate moving assist device 100 between a stored position, as depicted in FIG. 1, and a use position, as depicted in FIG. 2. In the stored position, it can be observed that there is little to no space 122 between the PTO end of driveline 108 and implement hitch 120, while in the use position depicted in FIG. 2, a space 222 between hitch 120 and driveline 108 is provided, as driveline 108 is raised into the approximate position necessary for coupling with the PTO.

Although the configuration depicted in FIG. 1 has CV-joint 118 resting upon the structure of implement hitch 120 in the storage position (an arrangement that is expected to be typical for most farm equipment that has a relatively standard position of the PTO relative to the hitch), assist device 100 could be used in other applications with a different geometry between hitch 120 and the PTO. In such embodiments, a portion of driveline 108 other than CV-joint 118 may contact hitch 120, or no portion of driveline 108 may contact hitch 120.

In some embodiments, frame 102 is depicted as the hitch tongue of implement 101, which may allow assist device 100 to be secured in a stationary position relative to driveline 108, and also in line with the longitudinal axis of driveline 108 and the PTO. However, this is in no way limiting; frame 102 could be any other portion of implement 101 that is located in a relatively stationary position with respect to driveline 108 so that assist device 100 can be used to assist in positioning driveline 108 for coupling to the PTO. In still other embodiments, frame 102 may instead be a part of a tractor providing the power to implement 101, where assist device 100 would be mounted to a part of the tractor frame.

Pivots 104, as shown in the figures, can be simple hinges formed between frame 102 and assist device 100, with assist device 100 secured to frame 102 via one or more pins or similar fasteners that pass through both assist device 100 and a portion of frame 102. When so configured, assist device 100 can rotate within a plane defined by the longitudinal axis of driveline 108. Such pins can be permanently affixed, e.g. where the pins are rivets, semi-permanently affixed, e.g. where the pins are comprised of a nut and bolt combination, or can be removable, e.g. where the pins are secured via a cotter pin or similarly removable clip that allows for quick removal of the pin and detaching of assist device 100. In embodiments where pivot 104 enables assist device 100 to be removed, assist device 100 can be transferred to other implements 101, thereby allowing a user to use one assist device 100 across multiple implements 101.

In other embodiments, pivot 104 may be implemented as a single shaft affixed to frame 102 to which assist device 100 is secured. Assist device 100 may secure to such a shaft by way of a clamping or latching mechanism, to allow for quick release of assist device 100. Such clamps or latches are well-known in the art. Still other embodiments may use different configurations of hinges, either permanent, semi-permanent, or readily detachable. The foregoing is intended to provide possible examples of embodiments only, and should not be taken to be limiting. Any means now known or later developed for securing assist device 100 to frame 102 in a fashion that allows assist device to rotate between storage and use positions may be employed.

In some embodiments, pivot 104 can provide a stop that defines the range of travel of assist device 100 between the storage position of FIG. 1 and the use position of FIG. 2. In the embodiment depicted in FIG. 2, pivot 104 is formed at least partially from a projection 105 at the pivot end of handle 110 (discussed in greater detail herein) that contacts frame 102 when assist device 100 is in its use position. The shape of projection 105 in combination with the location of protrusion 112 (also discussed further below) defines the total range of travel of assist device 100 between stored and operative positions. Other embodiments may use a portion of cradle 106 in contact with frame 102 to limit the range of travel, while still other embodiments may employ stops contained within or part of pivot 104. It should be understood that any suitable means can be employed to define the range of travel of assist device 100 without departing from the disclosed invention.

In various embodiments, the range of travel of a fully deployed assist device 100 may bring the center of gravity (CG) of assist device 100 over and just past pivot 104, so that the combination of the weight of driveline 108 and gravity acts to retain assist device 100 in its fully deployed position. Still other embodiments may limit the range of travel to a point prior to the CG of the assist device 100 passing over pivot 104, and use other means, such as a spring or a pin, to help retain assist device 100 in a deployed position. Such a spring or pin may comprise part of or be mechanically connected to pivot 104.

Cradle 106, in various embodiments, comprises the body of assist device 100, and may be configured and sized to receive and support driveline 108 when assist device 100 is in a use position. In this role, cradle 106 is further comprised of and acts as a carrier for roller 114 and one or more springs 116. Roller 114, which will be discussed in further detail herein, may form the primary operative component of cradle 106, physically supporting driveline 108 and transferring its load to cradle 106, which in turn transfers the load of driveline 108 to frame 102 via pivot(s) 104.

Driveline 108 is typically shipped as part of implement 101, and may comprise a shaft that runs between implement 101 and the PTO of the tractor or other towing vehicle. At the end of the shaft that connects to the PTO, driveline 108 may be equipped with a receiver 117, sized and shaped to connect and secure to the PTO. For example, where the PTO comprises a splined shaft, receiver 117 may be configured as a splined socket sized to receive the PTO. Receiver 117 may in turn be connected to CV-joint 118, which itself may be connected to the driveline shaft, as depicted in the figures. The driveline shaft may connect to a gearbox within implement 101 and/or a U-joint, depending on the needs and configuration of implement 101. The presence of CV-joint 118 at the PTO end of driveline 108 may allow the receiver 116 to tilt and rotate in a variety of angles, which can be employed to facilitate connection of driveline 108 to the PTO. The various components of driveline 108 are typically fabricated from a metal such as steel. As a result, the combined weight of the shaft of driveline 108 along with receiver 116, CV-joint 118, and potentially a U-joint on the implement end of driveline 108, can exceed 60 lbs.

Driveline 108 may be configured to telescope, with a plurality of concentric sections that can slide with respect to each other. A telescoping driveline 108 may facilitate connection to the PTO by allowing driveline 108 to extend or contract to engage or disengage with the PTO, such as when driveline 108 is axially aligned with the PTO, as will be discussed further herein.

Handle 110 is operably attached to cradle 106 in the various embodiments. Handle 110, as can be seen from the figures, substantially protrudes from one side of cradle 106 so as to form and provide a lever for moving assist device 100 at least vertically between storage and use positions. In the depicted embodiment, handle 110 is mounted offset from the axis of driveline 108 so as to allow operation without interference from driveline 108. It can be observed from the figures that handle 110 may have a length that extends substantially past cradle 106. This length may allow handle 110 to act as a lever, giving a user of assist device 100 a mechanical advantage in lifting driveline 108, thereby substantially reducing the amount of effort the user must expend to position driveline 108 correctly for coupling to the PTO. In some embodiments, the end of handle 110 distal from pivot 104 may be ergonomically shaped to facilitate a user's grip, and/or may be covered in a material such as vinyl, rubber, wood, plastic, or another similar material to improve user grip and comfort.

The length of handle 110 may be fixed at a length that offers maximum mechanical advantage in some embodiments. However, in other embodiments, the length could be varied to provide greater or lesser mechanical advantage. The overall length of handle 110 may be chosen with consideration given to the weight of driveline 108, the location of assist device 100 (the closer assist device 100 is mounted to the PTO, the less load is experienced by assist device 100 when driveline 108 is supported at the implement 101 end by a U-joint or gearbox), the available clearance with respect to implement 101 (where frame 102 is shorter, handle 110 has less distance before potentially interfering with implement 101), and/or general ease of use (a longer handle 110 may be easier to reach and manipulate during coupling in some embodiments).

In some embodiments, as seen in FIG. 1, when assist device 100 is in a storage position, handle 110 can dock with a protrusion 112 from frame 102 that will allow assist device 100 to be secured in the storage position. Protrusion 112 can serve to keep handle 110 centered while stored and/or be used to securely latch handle 110 to prevent unintentional movement of assist device 100. Securing assist device 100 in a storage position may be useful to prevent damage to assist device 100, frame 102, and/or driveline 108 if implement 101 is used over rough terrain where jolts may otherwise cause an unsecured assist device 100 to become dislodged from a storage position and impact surrounding structures.

As seen in the figures, in some embodiments, handle 110 forms part of and/or interfaces with pivot 104. In such embodiments, cradle 106 can attach to handle 110 via one or more mounting holes 113, where handle 110 doubles as a mounting rail. Other embodiments may also include a second mounting rail 111 opposite to handle 110, which forms part of and/or interfaces with a second pivot 104. It should be understood that the positions of handle 110 and mounting rail 111 can be swapped without affecting the functioning of assist device 100, if it is desired that handle 110 be located on the opposite side of assist device 100. Mounting rail 111 may have one or more mounting holes 113 that correspond with mounting holes 113 located on handle 110 to allow cradle 106 to be correctly positioned between handle 110 and mounting rail 111. Further, in embodiments where a plurality of mounting holes 113 are supplied as depicted in FIG. 2, the position of cradle 106 can be adjusted relative to pivot 104. This is not intended to be limiting, however, and cradle 106 could be made adjustable with respect to handle 110 and pivot 104 by any suitable means, such as clamps, screws, brackets, etc. In some embodiments, cradle 106 is adjustable in position to accommodate various heights and configurations of the PTO, and it is contemplated that a particular height for cradle 106 will be suitable to a particular combination of driveline 108 and PTO. In other embodiments, handle 110 can also be employed to move driveline 108 into position.

It will be appreciated by a person skilled in the art that the placement of cradle 106 relative to pivot 104 may affect the geometry of assist device 100 and the load and ease of manipulation experienced by a user of assist device 100. A cradle that is closer to pivot 104 can provide a greater mechanical advantage (the user experiences a lighter load through handle 110) in lifting heavier drivelines 108, but at the expense of a smaller range of lifting motion of driveline 108. Conversely, a cradle 106 that is spaced farther from pivot 104 can offer a greater range of lift for driveline 108, but at the expense of a heavier load to a user through handle 110.

Other configurations may have handle 110 attached to cradle 106, which itself forms a part of pivot 104. In such configurations, the ability to adjust the height of cradle 106 relative to pivot 104 may be accomplished by an adjustment mechanism that is part of cradle 106. Such adjustment mechanisms may include a portion of cradle 106 that can move relative to a second portion of cradle 106 that is secured to pivot 104, via mounting holes, slots, adjustment screws, threaded joint(s) that allow height adjustment via turning, clamps, sliders, sliding clamp joints, or any other suitable means for securely retaining some or all of cradle 106 at a desired distance from pivot 104.

Referring to FIG. 2, in embodiments, cradle 106 may be comprised of a roller 114 and one or more springs 116 (depicted as part of the side of cradle 106 in FIG. 2), the springs 116 attaching roller 114 to the structure of cradle 106 that is in turn mechanically linked to pivot 104. Roller 114 may directly accept driveline 108 at contact point 204 as assist device 100 is rotated into a use position. In this configuration, roller 114 may facilitate the further travel of assist device 100 as it passes to the deployed position depicted in FIG. 2. It will be readily understood by a person skilled in the art that the rotation of assist device 100 into a deployed position includes not just vertical travel, but travel along the longitudinal axis of driveline 108. Roller 114 thus rotates under driveline 108 following contact point 204, practically eliminating friction and associated wear to both driveline 108 and cradle 106, and serving to keep the load experienced by a user in operation of assist device 100 to a minimum.

Roller 114 may be manufactured from plastic with a single shaft or bolt running along its length to secure it in place. In other embodiments, roller 114 could be manufactured from any suitable material, e.g. metal, wood, rubber, or a similarly durable material, and may interface with cradle 106 for rotation using any suitable construction now known or later developed, such as a bearing or journal. Other embodiments may implement roller 104 using a series of rollers, balls, or other suitable shape. In the depicted embodiment, roller 104 is substantially flat along its length, to allow a user to move driveline 108 laterally with respect to the PTO. Roller 104 may be substantially sausage shaped, such as in the form of a tube with a longitudinally straight side. In other embodiments, roller 104 may be hour-glassed, having a smaller diameter in the middle compared to its ends, so as to provide a measure of centering bias to driveline 108. While the figures depict a single roller 114, other embodiments may employ a plurality of rollers 114, each roller 114 of the same or varying configurations. Still other embodiments may omit roller 114 in favor of a bearing surface, which may be configured to be low-friction, such as a bearing plate constructed from PTFE.

In some embodiments, cradle 106 may optionally contain one or more springs 116, which mechanically connect roller 114 to cradle 106 and act to absorb at least some of the load of driveline 108. Roller 114 is thus configured to have a measure of vertical travel (vertical being defined here as approximately along the longitudinal axis of handle 110, relative to pivot 104), but is held in a top-most position (farthest away from pivot 104) via spring(s) 116. Roller 114 can be deflected in its travel toward pivot 104 by applying pressure on roller 114 against the force of spring(s) 116. Where assist device 100 is so configured, when assist device 100 is in the deployed configuration of FIG. 2, driveline 108 can be manipulated vertically to aid in positioning with respect to the PTO. A user of assist device 100 can push down on driveline 108 and against springs 116 via roller 114 to reduce space 222, or release pressure to have springs 116 increase space 222, as needed to effect coupling driveline 108 to the PTO.

Other embodiments may locate spring(s) 116 in pivot 104, where spring(s) 116 can be configured to both retain assist device 100 in a deployed position, and provide assistance in lifting driveline 108 vertically. Such embodiments may typically require some form of positive retention of assist device 100 in the storage position of FIG. 1, as releasing assist device 100 from storage will result in spring(s) 116 biasing assist device 100 to the deployed position in FIG. 2. When contact point 204 is reached, spring(s) 116 in pivot 104 absorb at least some of the load of driveline 108 as assist device 100 continues to travel to a deployed position. A user may release handle 110 and manipulate driveline 108 vertically without experiencing the full weight of driveline 108, as the spring(s) 116 will assist in lifting driveline 108 vertically, depending on the particular spring(s) 116 employed. In other embodiments, a user could manipulate handle 110 to control the vertical position of driveline 108, but with a reduced load due to spring(s) 116.

It will be appreciated that the selection of spring(s) 116 will impact the amount of force/assistance experienced by a user of assist device 100 as driveline 108 is manipulated into a final position for coupling to the PTO. Spring(s) 116 that offer greater resistance will lessen the load of driveline 108 experienced by a user when lifting driveline 108, but require increased pressure if a downward movement is necessary, or will require a user to employ handle 110 to lower driveline 108. Conversely, a lighter choice for spring(s) 116 will make downward movement of driveline 108 easier, but at the tradeoff of increased weight experienced when driveline 108 is lifted or, if so configured, requiring a user to employ handle 110 to raise driveline 108, provided sufficient travel in handle 110 is present. Still other embodiments may employ an adjustment mechanism in connection with spring(s) 116 to preload spring(s) 116 with some measure of tension to fine tune the forces experienced by a user when assist device 100 is deployed, and/or to allow assist device 100 to be used with a variety of driveline 108 weights.

In some embodiments, assist device 100 may be equipped with two springs 116, designed only to hold, and to be slightly compressed upon receiving the weight of, driveline 108, thereby reducing the force experienced by a user as driveline 108 is manipulated into position relative to the PTO. Springs 116 may be selected to be of such a tension that a light force from a user will further compress springs 116 and thereby allow driveline 108 to be lowered, in further positioning relative to the PTO. In some embodiments, springs 116 are located in cradle 106, below the shaft used for roller 114. As force is applied to roller 114, the shaft (or other suitable attachment mechanism) is pushed down into springs 116, which in turn further compress springs 116 and cause an increase in the resistance forces supplied against the weight of driveline 108. Other embodiments may have more or less than two springs 116, and/or may arrange springs 116 in a configuration that causes the weight of driveline 108 to stretch, rather than compress, springs 116, causing springs 116 to provide force via tension. Still other embodiments may allow springs 116 to be adjusted to create a preload compression or tension, or be swapped for springs 116 of a different compression/tension amount, allowing assist device 100 to be adjusted to accommodate drivelines 108 of varying weights.

Still other embodiments may use other mechanisms to provide the force to counter the driveline 108 weight. Examples of such mechanisms include gas cylinders, elastic bands, hydraulic cylinders, or any other mechanism suitable for applying a resistance or counter force to offset the driveline 108 weight and facilitate positioning with respect to the PTO.

As is shown in FIG. 1, cradle 106 may be aligned substantially parallel to the longitudinal axis of driveline 108, and so does not contact driveline 108. Assist device 100 may be placed into stored position 112 any time assist device 100 is not being used to facilitate the coupling or uncoupling of driveline 108 to the PTO. When assist device 100 is moved to a use position as depicted in FIG. 2, roller 114 may interface with driveline 108 at contact point 204. Depending on the geometries involved in a given embodiment and installation of assist device 100, contact point 204 will occur at some point in the travel arc of handle 110 between the storage position depicted in FIG. 1 and the fully raised use position depicted in FIG. 2. Once contact point 204 is made, further rotation of handle 110 within the travel arc depicted in FIG. 2 will cause driveline 108 to lift. The amount of lift provided, depicted as space 222 between the implement's hitch and the PTO end of driveline 108, is dependent upon the location of assist device 100 on frame 102, the height of cradle 106 above pivot 104, and the overall range of rotation allowed by pivot 104.

Figure 3A:
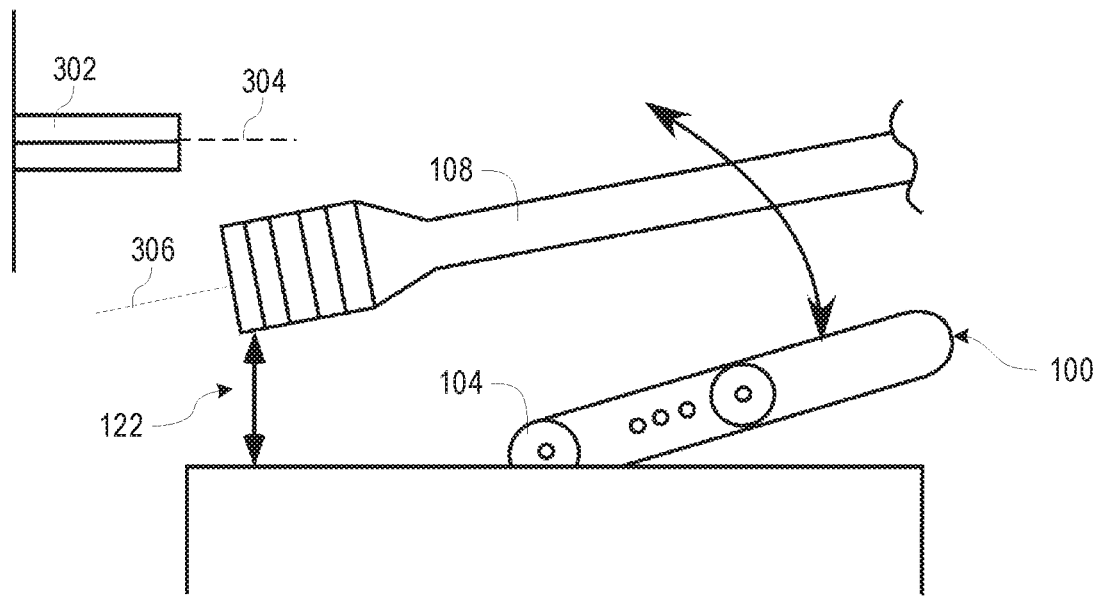
FIG. 3A illustrates a side schematic view of the assist device of FIGS. 1 and 2, with the assist device in a disengaged position, according to various embodiments.
Figure 3B:
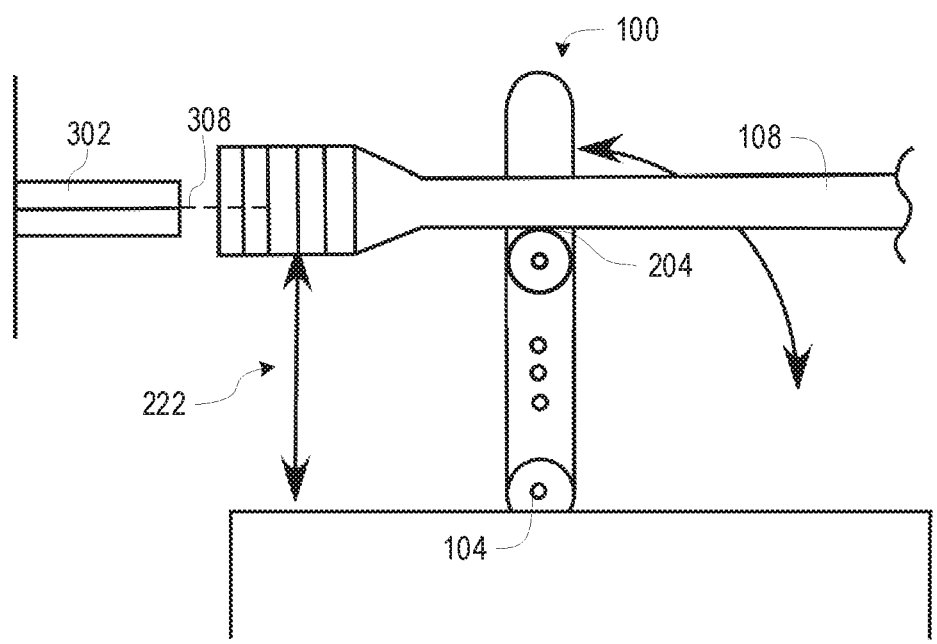
FIG. 3B illustrates a side schematic view of the assist device of FIGS. 1-3A, with the assist device in an engaged position and showing the driveline aligned with the PTO, according to various embodiments.
Figure 4:
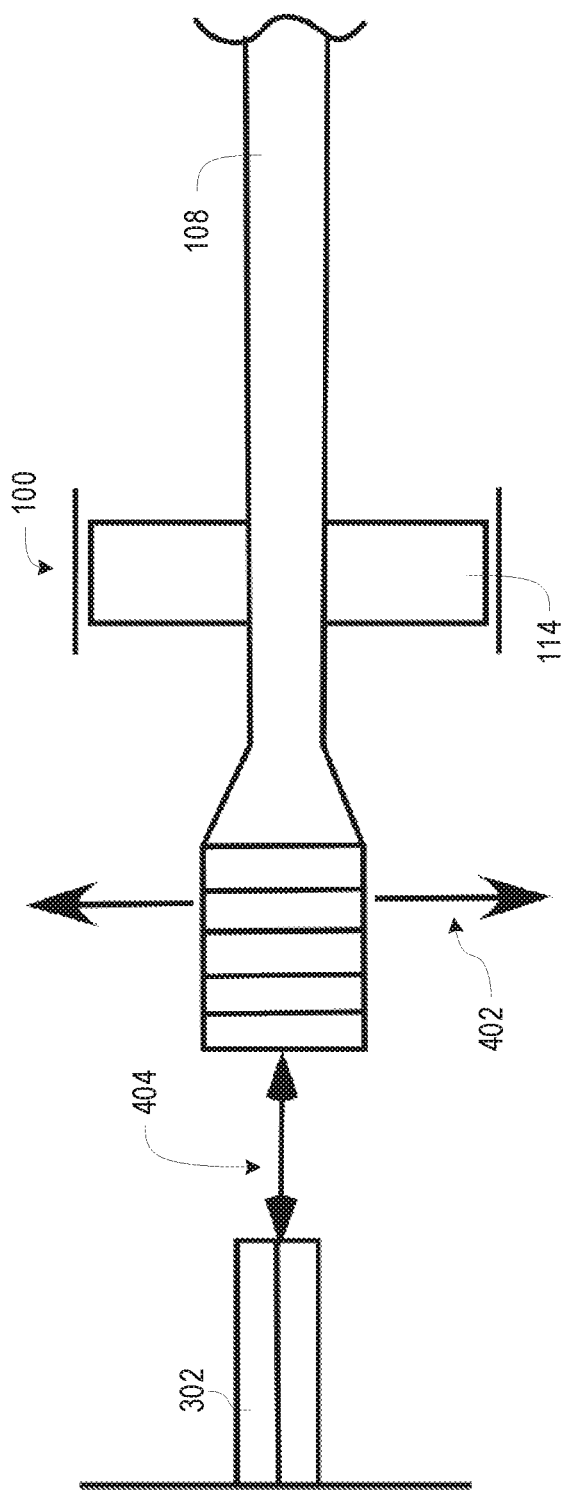
FIG. 4 illustrates a top schematic view looking down on the assist device of FIGS. 1-3B, depicting the alignment of the driveline with the PTO, according to various embodiments.

Referring now to FIGS. 3A, 3B and 4, the operation of the assist device 100 is schematically illustrated. FIG. 3A illustrates assist device 100 in an initial position, such as when assist device 100 is initially moved from stored position 112, and is ready to be rotated into a use position. Space 122 is shown relatively short, as compared with space 222 depicted in FIG. 3B. The alignment axis 304 of PTO 302 is shown as higher than alignment axis 306 of driveline 108, as expected when the implement is disconnected from the tractor, and driveline 108 is in a resting, disengaged position. The alignment axis 306 of driveline 108 coincides with a longitudinal axis of driveline 108.

Conversely, FIG. 3B illustrates assist device 100 in an engaged position. Driveline 108 is lifted by the engagement and rotation of the assist device 100. Space 222 is shown taller than space 122 in FIG. 3A, and driveline 108 is shown engaged with assist device 100 at contact point 204. It will be observed that the alignment axes of the PTO 302 and driveline 108 are on an aligned axis 308. In this position, driveline 108 can be secured to PTO 302 by sliding driveline 108 along its longitudinal axis (coincident with alignment axis 306) until the splined receiver 117 on CV-joint 118 (depicted in FIG. 1) engages with PTO 302. In various embodiments, driveline 108 may be configured to telescope, e.g. extend or contract along its longitudinal axis by way of one or more sliding or nesting components, to facilitate engaging PTO 302.

Turning to FIG. 4, an overhead schematic view of how driveline 108 engages with PTO 302 is depicted. As with FIG. 3B, an axis 404 is depicted that coincides with the longitudinal axis of driveline 108 as well as the alignment axis 304 of PTO 302, as assist device 100 is in an engaged position. Driveline 108 may telescope or otherwise move along axis 404 towards PTO 302 to engage PTO 302. Roller 114, part of assist device 100, may facilitate this movement. It will also be observed that roller 114, in some embodiments, may be larger than the width of driveline 108 where it engages assist device 100. This larger width of roller 114 may enable driveline 108 to move laterally with respect to axis 404 and the longitudinal axis of driveline 108; this possible movement is depicted by arrows 402. Movement along arrows 402 may facilitate coupling driveline 108 to PTO 302 where driveline 108 is initially laterally misaligned relative to PTO 302, resulting in an initial lateral misalignment of alignment axis 304 with alignment axis 306. Such misalignment may occur from a variety of possible mechanisms, e.g., where an implement may be attached at a slight angle relative to PTO 302, or where an operator may connect the driveline 108 prior to attaching the implement to the hitch of the tractor of PTO 302.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways.

This application is intended to cover any adaptations or variations of the embodiments discussed herein. Therefore, it is manifestly intended that embodiments be limited only by the claims and the equivalents thereof.

The invention that is claimed is:

1. An assist device for an implement, comprising: a pivot attached to
   a frame;
   a cradle attached to the pivot, the cradle configured to receive a driveline of the implement, the driveline including a longitudinal axis, the cradle comprised of a first side and a second side, each of the first side and second side attached to the pivot, where the driveline is disposed between the first side and second side when the assist device is engaged with the driveline; and
   a handle attached to one of the first side or second side, and extending past the cradle and the other of the first side or second side, distally from the pivot, configured to allow a user to rotate the cradle about the pivot,
   wherein the cradle is disposed apart from the pivot so that rotating the cradle about the pivot causes the cradle to change height relative to the frame, enabling the cradle to selectively engage with the driveline and raise the driveline into a position for coupling the driveline to a power take-off.

2. The assist device of claim 1, wherein the cradle is configured to allow the driveline to extend and/or contract along the driveline's longitudinal axis.

3. The assist device of claim 2, wherein the cradle further comprises a roller.

4. The assist device of claim 3, wherein the cradle can rotate about the pivot between a storage position and a position where the roller is engaged with the driveline and accepts at least part of the weight of the driveline.

5. The assist device of claim 3, wherein the roller is attached to the cradle using at least one spring, the at least one spring being configured to accept at least part of the weight of the driveline during coupling of the driveline to the power take-off.

6. The assist device of claim 2, wherein the cradle is further configured to allow the driveline to move perpendicular to the driveline's longitudinal axis.

7. The assist device of claim 1, wherein the frame is part of an implement frame.

8. The assist device of claim 1, wherein the frame is part of a tractor frame.

9. The assist device of claim 1, wherein the cradle can be selectively detached from the pivot.

10. An implement, comprising:
    a frame;
    an implement with a driveline, the driveline having a longitudinal axis; and an assist device secured to the frame, the assist device further comprising:
    a cradle sized to receive the driveline, the cradle comprised of a first side and a second side, where the driveline is disposed between the first side and second side when the assist device is engaged with the driveline; and
    a handle attached to one of the first side or second side and extending past the cradle and the other of the first side or second side, the cradle configured to allow a user to rotate the cradle with respect to the frame and in line with the longitudinal axis;
    wherein rotating the cradle causes the cradle to change height relative to the frame, and cause the cradle to selectively engage with the driveline and raise the driveline into a position that facilitates coupling the driveline to a power take-off.

11. The implement of claim 10, wherein the cradle is configured to allow the driveline to extend and/or contract along the driveline's longitudinal axis.

12. The implement of claim 11, wherein the cradle further comprises a roller.

13. The implement of claim 12, wherein the cradle can rotate between a storage position and a position where the roller is engaged with the driveline and accepts at least part of the weight of the driveline.

14. The implement of claim 12, wherein the roller is attached to the cradle using at least one spring, the at least one spring being configured to accept at least part of the weight of the driveline during coupling of the driveline to the power take-off.

15. The implement of claim 10, wherein the cradle is further configured to allow the driveline to move perpendicular to the driveline's longitudinal axis.

16. The implement of claim 10, wherein the power take-off is part of a tractor configured to tow the implement.

17. A method for coupling a driveline of an implement with a power take-off, comprising:
  rotating a cradle about a pivot, the cradle comprised of a first side and a second side, each of the first side and second side attached to the pivot, where the driveline is disposed between the first side and second side when the cradle is engaged with the driveline;
  using a handle attached to one of the first side or second side, and extending past the cradle and the other of the first side or second side, distally from the pivot, so as to cause the cradle to engage the driveline; and
  coupling the driveline with the power take-off by further rotating the cradle about the pivot, so as to cause the driveline to raise vertically away from a frame of the implement into an engagement position.

18. The method of claim 17, wherein the cradle is configured to allow the driveline to extend and/or contract along the driveline's longitudinal axis, and coupling the driveline with the power take-off further comprises extending and/or contracting the driveline along the driveline's longitudinal axis, when the driveline is in the engagement position, until the driveline engages the power take-off.

19. The method of claim 18, wherein the cradle is further configured to allow the driveline to move perpendicularly with respect to its longitudinal axis, and coupling the driveline with the power take-off further comprises moving the driveline perpendicularly when the driveline is in the engagement position.

20. The method of claim 19, wherein cradle engages the driveline using a roller attached to the cradle using at least one spring, the at least one spring being configured to accept at least part of the weight of the driveline during coupling of the driveline to the power take-off.

* * * * *